United States Patent [19]

Spooner

[11] 4,347,507
[45] Aug. 31, 1982

[54] VISUAL DISPLAY APPARATUS

[75] Inventor: Archer M. Spooner, Orlando, Fla.

[73] Assignee: Redifon Simulation Limited, Sussex, England

[21] Appl. No.: 105,875

[22] Filed: Dec. 21, 1979

[30] Foreign Application Priority Data

Dec. 21, 1978 [GB] United Kingdom ............... 49521/78

[51] Int. Cl.³ .............................................. G09G 3/00
[52] U.S. Cl. ................................ 340/705; 340/27 R; 340/709; 358/104; 358/250; 434/44
[58] Field of Search ............ 340/27 R, 27 NA, 366 F, 340/712, 706, 805, 814, 724, 709, 705; 434/44, 43; 358/103, 104, 88, 89, 250, 90; 455/605, 606, 609, 612; 356/152; 350/298

[56] References Cited

U.S. PATENT DOCUMENTS

| | | | |
|---|---|---|---|
| 3,614,314 | 10/1971 | Rossire | 350/298 |
| 3,936,148 | 2/1976 | Ellis | 340/27 NA |
| 4,048,653 | 9/1977 | Spooner | 358/250 |
| 4,153,913 | 5/1979 | Swift | 358/93 |

OTHER PUBLICATIONS

*Naecon 76 Record*, Lewis et al., pp. 894–902.

*Conference: Agard Lecture Series No. 76 on Electro–Optical Systems*, Shepherd, pp. 4.1–4.13.

*Primary Examiner*—James J. Groody
*Attorney, Agent, or Firm*—Larson & Taylor

[57] ABSTRACT

The invention provides head-coupled area-of-interest visual display apparatus particularly for ground-based craft-flight simulators. The apparatus provides binocular, pseudo-collimated vision of a display, projected onto a part-spherical retro-reflective screen, for two pilots, covering an area of interest centered upon each pilot's line of view. A separate image generator is used for each pilot and may both be of the computer generated image, laser-scanned model or closed-circuit television type. For the pseudo-collimated viewing, the same image is projected for left and right eyes for each pilot from points on a respective pilot helmet, horizontally in line but vertically displaced above the pilot's eye position. Line scan apparatus is mounted in the pilots' cockpit; line image transmission is by fibre optic light guide ribbons; and frame scan apparatus is mounted on the two pilots' helmets. Sensors detect head/helmet movements of each pilot to permit voluntary individual scanning of a wide angle of simulated view from the craft.

6 Claims, 5 Drawing Figures

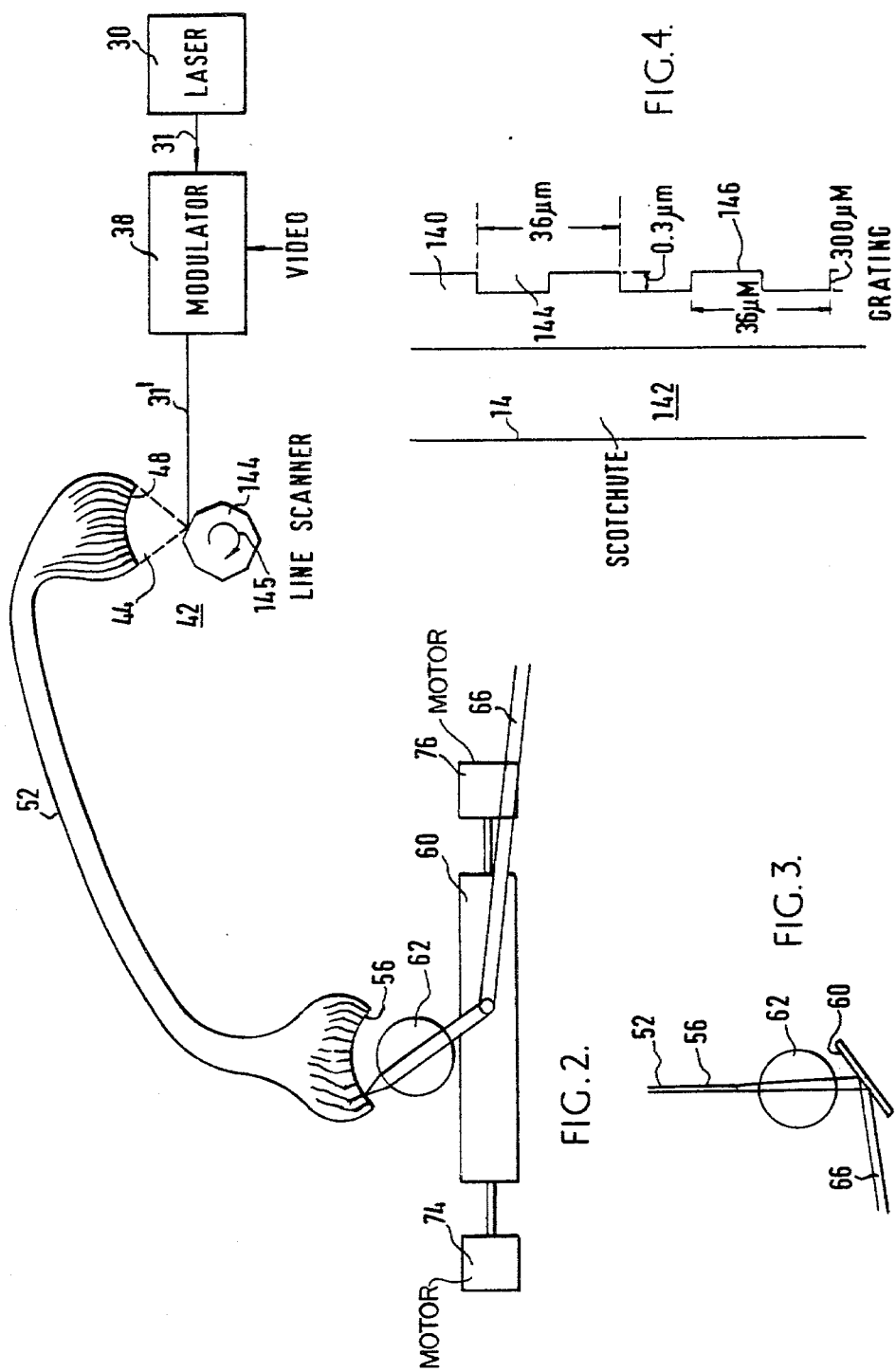

VISUAL DISPLAY APPARATUS

This invention relates to visual display apparatus, particularly for ground-based flight simulators and particularly for providing a display covering a wide-angle field of view. The invention provides such apparatus capable of providing pseudo-collimated simultaneously for two pilots.

The apparatus is of the head-coupled area-of-interest type, wherein an image projected upon a screen is appropriately changed both according to the simulated craft position and angular orientation and according to the respective viewer's instantaneous line of view and is simultaneously moved on the screen to occupy the respective viewer's field of view.

Apparatus of this type is known. Such apparatus provided an area-of-interest display for a sole viewer which was pseudo-collimated, that is, the same image was projected for left and right eyes, so as to appear at infinity.

The present invention extends the capability of such apparatus to provide individual pseudo-collimated displays simultaneously for pilot and co-pilot.

Accordingly, the invention provides head-coupled, area-of-interest, visual display apparatus providing pseudo-collimated viewing for more than one viewer, comprising a part-spherical retro-reflective screen of area greater than a viewer's field of view and, for each viewer, a helmet, sensing means for sensing the orientation of the respective viewer's head and helmet, visual image generating means for generating a simulated view in the direction of the respective viewer's instantaneous line of view according to a common simulated vehicle position and heading and under control of the respective sensing means, a laser light source, a laser beam modulator, optical means for providing identical left eye and right eye views, separate line scanners for each said view for scanning the modulated laser beam over the input ends of respective fibre optic light guides, the said fibre optic light guides having their output ends at spaced-apart positions on the respective viewer's helmet, and frame scanning means mounted on the said helmet for receiving light from the light guide outputs and projecting the light as a scanned image upon the said screen.

SHORT DESCRIPTION OF DRAWINGS

In order that the invention may readily be carried into practice, one embodiment will now be described in detail, by way of example, with reference to the accompanying drawings, in which:

FIG. 1 consisting of FIGS. 1A and 1B is a diagrammatic perspective view showing a pilot and co-pilot seated in relation to a part-spherical screen, with a block schematic diagram of apparatus for pseudo-collimated viewing by the two pilots;

FIG. 2 is a diagrammatic representation of one laser source, laser beam modulator, line scanner, fibre optic light guide ribbon, and helmet-mounted frame-scanner combination used in the apparatus of FIG. 1;

FIG. 3 is a diagrammatic side view of the frame scanner of FIG. 2; and

FIG. 4 is a diagrammatic cross-section view in a vertical plane of part of the screen surface and diffraction grating layer of a modified retro-reflective screen used in the apparatus of FIG. 1.

DESCRIPTION OF THE EXAMPLE

Figure 1A:
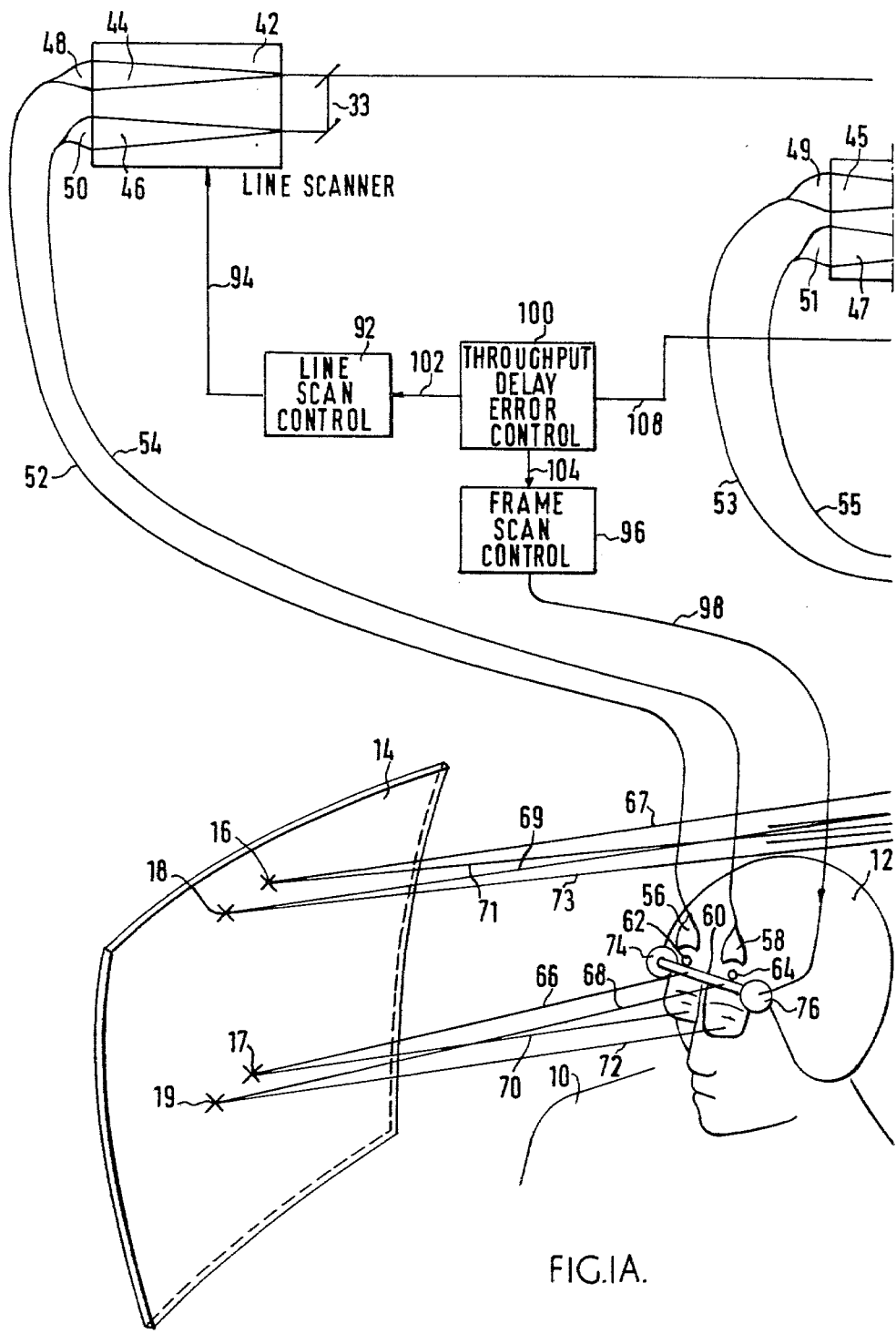

In the accompanying drawings the same elements are indicated by the same reference numerals throughout.

Figure 1B:
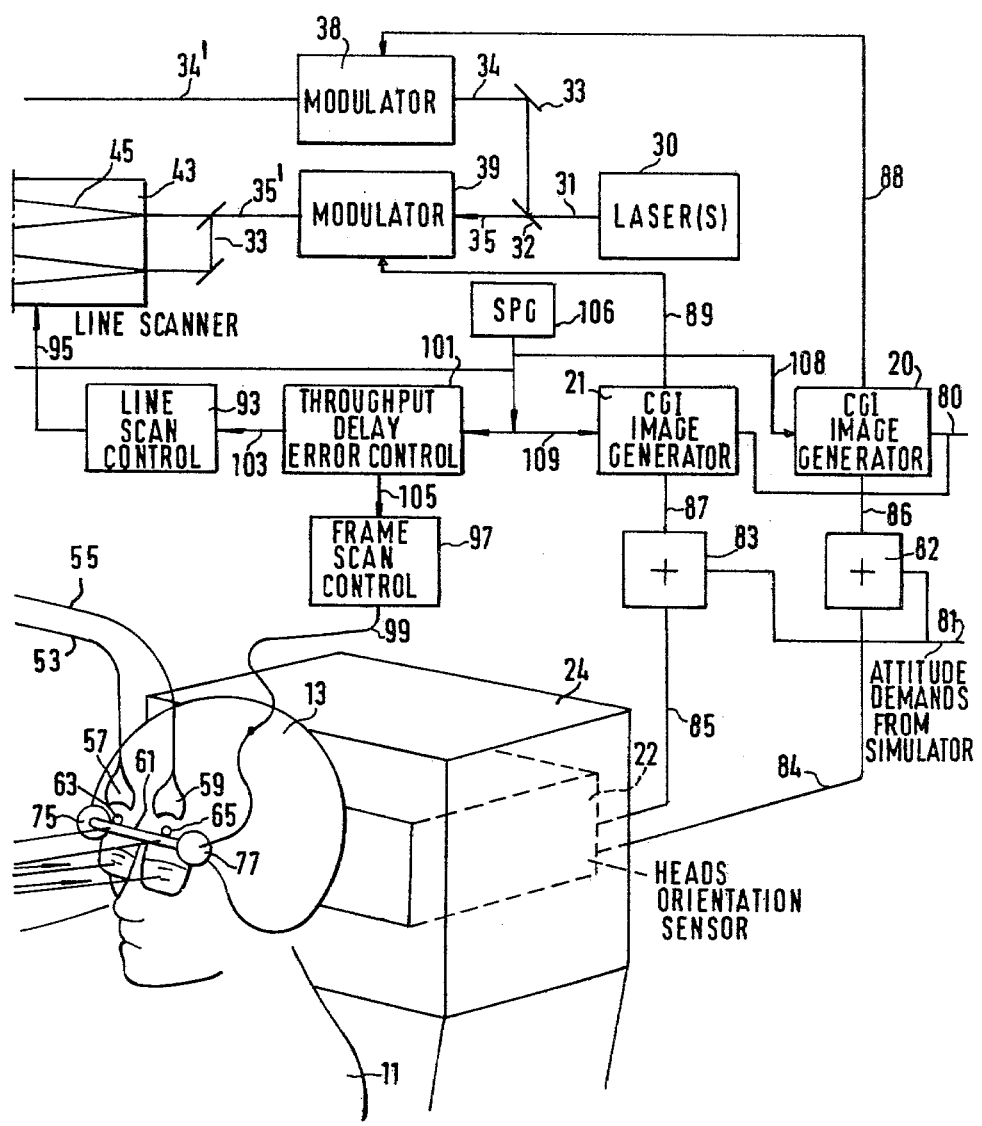

FIG. 1 shows in diagrammatic form the apparatus according to the invention for generating and displaying individual pseudo-collimated area-of-interest views for pilot and co-pilot. The pilot 10 wearing a helmet 12 is seated in front of a part-spherical, retro-reflective screen 14, his line of vision, for right and left eyes and distant viewing, intersecting the screen at points 17 and 19, respectively. The field of view for each eye is centred on the respective one of these two points. The views displayed are identical for right eye and left eye but are displaced laterally by the distance between the two points 17 and 19 so that the pilot 12 sees a pseudo-collimated view, that is to say, the displayed view appears to be at infinity and not at the distance of the screen 14. The combined left eye and right eye views seen by the pilot will be referred to as the pilot's displayed view.

The pilot's displayed view depends, in this example, upon the simulated position of an aircraft during an exercise flight, the attitude of the aircraft, the pilot's seating position in the aircraft and the pilot's instantaneous line of view as determined by the instantaneous orientation of the pilot's head and helmet. The position of points 17 and 19 on the screen 14 and hence the position of the pilot's displayed view on the screen depends only on the pilot's head and helmet orientation.

The image required is generated by an image generator 20 of the computer-generated image type and the pilot's head orientation is sensed by a head orientation sensor 22, which is fixedly mounted within the simulated aircraft cockpit in a mounting 24. The displayed view is projected onto the screen 14, centred in the appropriate locations as two raster-scanned images, the line scan apparatus being cockpit-mounted and the frame scan apparatus being mounted on the helmet 12. Line scan may be either across the screen 14 or in a vertical direction. In the present example, line scan is such that the projected scan line on the screen and the line joining a pilot's two eyes lie in one plane. The frame scan is in a plane orthogonal to that plane. Thus, if a pilot is sitting upright, line scan is horizontal and frame scan vertical.

The co-pilot 11 wearing a helmet 13 is also seated in front of the retro-reflective screen 14. The co-pilot's line of vision, for right and left eyes respectively and for distance viewing, intersect the screen 14 at points 16 and 18. The field of view for each eye of the co-pilot is centred on the respective one of these two points.

The views displayed are identical for right eye and left eye but are displaced laterally by the distance between the two points 16 and 18, so that the co-pilot 13 also sees a pseudo-collimated view. The combined views seen by the co-pilot will be referred to as the co-pilot's displayed view.

The co-pilot's displayed view depends upon the simulated position of the aircraft during the exercise flight, the altitude of the aircraft, the co-pilot's seating position in the aircraft and the co-pilot's instantaneous line of view. The first two factors will be the same as for the pilot. The co-pilot's seating position will be different but will not change during an exercise flight. The head orientation will be independent and individual to the co-pilot and require a separate image generator.

The image required for the co-pilot is generated by an image generator 21, also of the computer-generated image type and the co-pilot's head orientation is separately sensed by the head orientation sensor 22. The displayed view is projected onto the screen 14, in the appropriate locations as two raster-scanned images, the line scan apparatus being cockpit-mounted and the line scan apparatus being mounted on the helmet 13.

Referring still to FIG. 1, a laser source 30 provides an output laser beam 31 which is directed through a beam splitter and reflector combination 32, 33 to provide two beams 34 and 35 of equal intensity. Laser beam 34 passes through a full-colour modulator 38 controlled from the image generator 20 according to the pilot's view to be projected. The modulated beam 34 passes to a double line scanner 42 fixedly mounted in the simulated aircraft cockpit. The two scanners, described in detail later herein, provide two respective scanned beams 44 and 46 which are respectively scanned over the input ends 48 and 50 of two fibre optic light guide ribbons 52 and 54.

The two fibre optic light guides 52, 54 provide a flexible linkage between the fixed line scanner 42 and the pilot's movable helmet 12. The emergent scanned light beams from the respective ends 56 and 58 of the light guides 52 and 54 are focussed by spherical lenses 62 and 64 onto the screen 14 and directed onto a plane mirror 60. The right eye beams are reflected by the mirror 60 along divergent paths to form a scan line the centre of which is shown at 66. Similarly, the left eye beams are reflected by the mirror 60 along divergent paths to form a scan line the centre of which is shown at 68. The centre image lines of the pilot's right eye and left eye presentations of the view are thereby formed on the screen 14, each line having its respective mid point at 16 and 18 and being viewed by the pilot 10 in the respective line of view 70 and 72.

The mirror 60 is long in relation to its width and is carried in bearings at its end which are mounted on the helmet 12. These bearings are provided by motors 74 and 76 at the two ends which move the mirror 60 to provide the required frame scan.

The mirror 60 may be a single plane mirror which is either oscillated or rotated by the motors 74, 76 on its axis parallel to the plane in which the line scan is projected, on the mirror 60 may be a multi-faceted mirror rod of, for example, octagonal cross-section which is continuously rotated by the motors 74, 76. In the present example, the mirror 60 is a single plane mirror and is oscillated for frame scan.

As the pilot's head moves, so does the displayed view move over the screen, so as to be in the pilot's new line of view and the view itself is changed according to the simulated real world view in the direction of the pilot's line of view.

To this end, the visual system receives data from the host flight computer on lines 80 and 81. Position data defining the simulated aircraft position throughout a simulated flight exercise is supplied to the image generator 20 on line 80. Attitude data, defining the simulated aircraft instantaneous attitude, is supplied on line 81 to a vector summing unit 82 together with head orientation data, defining the pilot's actual instantaneous line of view, on line 84. The summed output is supplied to the image generator 20 on line 86. A throughput delay error signal obtained by subtracting the pilot's head attitude input to the image generator one throughput delay period ago from the current head attitude position is supplied to the throughput delay error control 100 on line 108.

The image, duplicated respectively for the pilot's right eye and left eye views, in accordance with the inputted data, and allowing for the known seating position of the pilot in the simulated aircraft type, is supplied to the modulator 38 on line 88.

It will be appreciated that the change of the displayed image with simulated aircraft position is relatively slow. However, the change of the displayed image with head orientation is complete and relatively very rapid. The image generator is unable to compute an entirely new image immediately a new line of view for the pilot is established. To overcome this limitation the residual old displayed view is derotated to its former screen position until the computed new displayed view is available. Such derotation is effected by an overriding control of line scan or frame scan or both.

Line scan control signals are supplied to the line scanners of unit 42 from unit 92 by way of line 94. Frame scan control signals are supplied to the frame scan motors 74, 76 from unit 96 by way of a flexible line 98. Overriding line and frame scan controls are effected by a throughput delay error compensation unit 100 by way of lines 102 and 104, respectively. For this purpose, pilot head orientation data on line 84 is supplied also to the compensation unit 100.

A synchronising pulse generator 106 supplies pulses on line 108 to both the CGI image generator 20 and to the compensation unit 100. The phase of the synchronising pulses is temporarily advanced or delayed as required relatively to that of the generated images on lines 88 and 90 to provide the required line or frame shift and hence the required image derotation, following sensed pilot's head movement.

It will be noted that the projection middle lines 66 and 68 do not coincide with the lines of view 70 and 72, for the reason that projection is effected from above the pilot's eyes. Projected onto any horizontal plane, the respective lines are coincident but, projected onto any vertical plane, the respective lines diverge away from the screen. The angle of divergence is small but is nevertheless great enough, compared with the apex angle of the half-brilliance cone of reflection of a retro-reflective screen material to result in a viewed image of much reduced brilliance. It is preferred therefore to use a screen of modified retro-reflective material for which the axis of the half-brilliance cone of reflection is depressed downwardly by the angle between the projection lines 66, 68 and the line of view lines 70, 72.

An independent view for the co-pilot is provided in similar manner. Laser beam 35 passes through a full-colour modulator 39 controlled from the image generator 21 according to the co-pilot's view. The modulated beam 35 passes to a double line scanner 43 fixedly mounted in the simulated aircraft cockpit. The two scanners provide two respective scanned beams 45 and 47 which are respectively scanned over the input ends 49 and 51 of two fibre optic light guide ribbons 53 and 55.

The two fibre optic light guides 53, 55 provide a flexible linkage between the fixed line scanner 43 and the co-pilot's movable helmet 13. The emergent scanned light beams from the respective ends 57 and 59 of the light guides 53 and 55 are focussed by spherical lenses 63 and 65 onto the screen 14 and directed onto a plane mirror 61. The co-pilot's right eye beams are reflected by the mirror 61 along divergent paths to form a scan line the centre of which is shown at 67. Similarly, the co-pilot's left eye beams are reflected by the mirror 61 along divergent paths to form a scan line the centre of which is shown at 69. The centre image lines of the co-pilot's right eye and left eye presentations of the view are thereby formed on the screen 14, each line having its respective mid point at 17 and 19 and being viewed by the co-pilot 11 in the respective line of view 71 and 73.

The mirror 61 is carried in bearings at its ends which are mounted on the helmet 13. These bearings are provided by motors 75 and 77 at the two ends which move the mirror 61 to provide the required frame scan.

In the present example, the mirror 61 is a single plane mirror and is oscillated for frame scan.

As the co-pilot's head moves, so does the co-pilot's displayed view move over the screen, so as to be in the co-pilot's new line of view and the view itself is changed according to the simulated real world view in the direction of the co-pilot's line of view.

To this end, the visual system receives data from the host flight computer on lines 80 and 81. Position data defining the simulated aircraft position throughout a simulated flight exercise is supplied to the image generator 21 on line 80. Attitude data, defining the simulated aircraft instantaneous attitude, is supplied on line 81 to a vector summing unit 83 together with head orientation data, defining the co-pilot's actual instantaneous line of view, on line 85. The summed output is supplied to the image generator 21 on line 87. A throughout delay error signal for the co-pilot's view is similarly obtained by subtracting the co-pilot's head attitude input to the image generator 21 one throughout delay period ago from the current head attitude position is supplied to the throughput delay error control 101 on line 109.

The image duplicated respectively for the co-pilot's right eye and left eye views, in accordance with the inputted data, and allowing for the known seating position of the co-pilot in the simulated aircraft type, is supplied to the modulator 39 on line 89.

Line scan control signals are supplied to the line scanners of unit 43 from unit 93 by way of line 95. Frame scan control signals are supplied to the frame scan motors 75, 77 from unit 97 by way of a flexible line 99. Over-riding line and frame scan controls are effected by a throughput delay error compensation unit 101 by way of lines 103 and 105, respectively. For this purpose, co-pilot head orientation data on line 85 is supplied also to the compensation unit 101.

The synchronising pulse generator 106 supplies pulses on line 109 to both the CGI image generator 21 and to the compensation unit 101. The phase of the synchronising pulses is temporarily advanced or delayed as required relatively to that of the generated images on lines 89 and 91 to provide the required line or frame shift and hence the required image derotation, following sensed co-pilot head movement.

The co-pilot is seated at the same distance from the screen 14 as is the pilot and the frame scan mirror 61 is the same distance above the co-pilot's eyes as the frame scan mirror 60 is above the pilot's eyes. The angle between the projection line and the line of view is thus the same for pilot and co-pilot. The same modification of retro-reflection angle of the screen 14 is therefore equally effective for both pilot and co-pilot.

The various units of the apparatus, shown in the block schematic part of FIG. 1, will now be considered in further detail in the following order:

C.G.I. Image Generator.
Laser Source.
Laser Beam Modulator.
Line Scanner.
Fibre Optic Light Guide Ribbon.
Frame Scanner.
Retro-reflective Screen.
Helmet-Head Orientation Sensor.
Throughput Delay Error Compensation Unit.
Line Scan Control.
Frame Scan Control.

C.G.I. IMAGE GENERATOR

The displayed view corresponds to a real world view as it would be visible from the simulated aircraft during flight. In earlier visual display apparatus for ground-based simulators, the visual image was generated using a scale model and a closed-circuit television camera. The camera lens, comprising an optical probe, was moved over the model correspondingly to the aircraft simulated position, altitude, heading, pitch and roll. The generated image was varied according to all these factors.

According to a more recent technique, now well established, the same form of image is computer-generated. The technique is explained in text books such as, for example, "Principles of Interactive Computer Graphics", by William M. Newman and Robert F. Sproull, published in 1973 by McGraw-Hill Book Company, New York and elsewhere.

The signals available to the image generator computer from the host flight computer of the simulator are: aircraft position, X.Y., altitude, heading, pitch and roll. C.G.I. image generators are known which generate the direct ahead view from the aircraft according to the input data, including solid-looking features with surface detail, concealing hidden edge-lines and surfaces as the aircraft flies around such objects and clipping and windowing the display according to the simulated field of view.

The image generator 20 of FIG. 1 is of this general type. Aircraft position and altitude data are supplied from the host flight computer on line 80. Aircraft heading, pitch and roll data are supplied on line 81.

However, the image generated in the apparatus of FIG. 1 is in the actual instantaneous line of view of the pilot. This view is determined also by the pilot's line of view heading and pitch and head roll relatively to the aircraft axes. Head azimuth, head pitch and head roll are determined by the head orientation sensor 22 and these data are supplied on line 84 to the summing unit 82, which adds these values to the aircraft heading, pitch and roll values respectively. The output information defining the pilot's line of view relatively to the simulated terrain overflown is supplied to the image generator 20 on line 86.

The point midway between the pilot's eyes is a constant position offset above and to the left of the aircraft longitudinal axis. This offset requires only constant values to be added to aircraft altitude and position respectively throughout an entire exercise.

It will be appreciated that, at cruising altitudes the offsets for left and right eyes, and for pilot's seating position in the aircraft are of small importance. However, for runway, near-ground and near-target manoeuvres, they are of great importance.

For the generation of separate pilot and co-pilot views, two similar type image generators 20 and 21 are used. The second view generated by the image generator 21 is in the instantaneous line of view of the co-pilot. This view is determined by the co-pilot's line of view heading and pitch and head roll relatively to the aircraft axes. Co-pilot head azimuth, head pitch and head roll are determined by the head orientation sensor 22 and these data are supplied on line 85 to the summing unit 83, which adds these values to the aircraft heading, pitch and roll values, respectively, on line 81. The output information defining the co-pilot's line of view relatively to the terrain is supplied to the image generator 21 on line 87.

The point midway between the co-pilot's eyes is a constant position offset above and to the right of the aircraft longitudinal axis. This offset similarly requires only constant values to be added to aircraft altitude and position respectively.

Pilot video signals are transmitted to modulator 38 on line 88. Co-pilot video signals are transmitted to modulator 39 on line 89.

LASER SOURCE, LASER BEAM MODULATOR, LINE SCANNER, FIBRE OPTIC LIGHT GUIDE RIBBON AND FRAME SCANNER

The laser source, laser beam modulator, line scanner, fibre optic light guide ribbon and frame scanner elements of the apparatus will be described together with reference to FIG. 2 and FIG. 3.

FIG. 3 shows the laser beam source 30 which provides the output laser beam 31 directed through the full colour modulator 38. Both the laser beam source 30 and the modulator 38 are of known form. The full-colour modulated beam output is shown at 31' in this figure, in which intermediate beam-splitters are not shown. The line scanner is shown generally at 42.

The line scanner comprises a synchronously-driven polygonal section mirror drum 144 which rotates continuously in the direction shown by the arrow 145 to sweep the beam 31' over the scan path 44. One pass occurs for the movement of each mirror facet of the mirror drum 144 past the beam 31'.

A fibre optic light guide, formed into a flat ribbon 52 over most of its length, has individual groups of fibres formed into an arc at the input end 48 of the light guide. The width of the line scan 44 exactly covers the arc at 48, so that the modulated beam 31' is scanned along the arc at 48 for each line of the image.

At the output end 56 of the fibre optic light guide 52, the individual groups of fibres are similarly formed into an arc the fibre groups occurring in the same sequence at the two ends 48 and 56, so that the scanned image line at the input end 48 is exactly reproduced at the output end 56.

The emergent rays from the output end 56 of the light guide 52 are focussed by the spherical lens 62 onto the face of the frame scanning mirror 60. As shown in FIG. 1, the mirror 60 is mounted on the pilot's helmet 12 in bearings provided by reciprocating motors 74 and 76.

With the mirror 60 stationary, the emergent rays are reflected from the mirror 60, as shown instantaneously at 66, to form a single line of the image. As the mirror 60 is moved, successive lines of the image are projected to form the entire scanned image.

FIG. 3 shows, in side view, the output end 56 of the light guide 52, the spherical lens 62, the mirror 60 and the reflected beam 66 as described above with reference to FIG. 2.

A second line scanner, comprising a second mirror drum, produces a second line scan over the input end 50 of the second fibre optic light guide 54, as is shown in FIG. 1. The output end 58 of this second light guide 54 provides emergent rays which are focussed by a second spherical lens 64 onto the same reciprocating mirror 60. The two helmet mounted optical systems, with the common frame scan mirror 60, together provide the right eye image and left eye image of the pilot's displayed view.

As already explained, the identical right eye and left eye images provide the pseudo collimated display for the pilot.

An exactly duplicate arrangement mounted on the co-pilot's helmet 13 provides the corresponding visual display for the co-pilot.

MODIFIED RETRO-REFLECTIVE SCREEN

Retro-reflective projection screen material such as that sold under the name SCOTCHLITE (Registered Trade Mark) has a reflection characteristic such that light incident upon the screen is mostly reflected back along the line of incidence. That is to say, reflected light is brightest on the line of incidence, falling in intensity rapidly as the eye is displaced from the line of incidence in any direction. With one retro-reflective material, observed brightness falls to one-half intensity at an angle of 0.8° displacement from the line of incidence. Stated in other words, the area of half-brightness is the surface of a cone having its axis on the line of incidence and having a half-angle of 0.8° at its apex.

In the projection apparatus described with reference to FIG. 1, the line of incidence 66, between the frame scanner 60 and the screen 14, makes an angle which is also approximately 0.8° with the line of view 70, between the screen 14 and the eye of pilot 10. Thus, with an unmodified retro-reflective screen, the projected image would be seen at half-brightness by the pilot.

In the apparatus of the invention, it is preferred to modify the reflection characteristic of the screen in order to increase the brightness of the projected image on the pilot's line of view. This modification is effected by placing a diffraction grating in front of the screen surface. FIG. 4 shows the required construction.

In FIG. 4, which is a section view in the vertical plane including both the line of incidence 66 and the line of view 70, the surface of the retro-reflective screen is shown at 14. Placed in front of the screen 14 is a diffracting layer 140 of material having a refractive index of 1.5.

The layer 140 is separated from the screen 14 by a layer of air 142. Neither the depth of the layer of air 142 nor that of the refracting layer 140 is critical but both may be of the order of 10 to 100 mm.

The front face of the refracting layer 140 is formed into a diffraction grating of horizontal grooves 144, leaving horizontal lands 146. The width of the grooves 144 and lands 146 is approximately equal. Calculated for light of 550 nm., and a refractive index of 1.5, the depth of the grooves 144 is 0.3 mm., and the spacing of the grooves is 36 mm., in the vertical direction, as shown in the drawing.

The modified reflection characteristic of the composite retro-reflective surface and diffraction layer, in the plane of the drawing, is that the light reflection along the line of incidence is reduced to a value of about 90% of that for the unmodified screen. The 10% of light not reflected along the line of incidence is distributed at angles above and below the line of incidence corresponding to first- and higher-diffracted orders. Of these, the brightest are the two are the angle of 0.8° above and below the line of incidence. That one which is 0.8° below the line of incidence is along the line of view. By this means, the projected image brightness along the line of view is significantly increased.

Head/Helmet Orientation Sensor

Mechanical linkages have been proposed to sense the orientation of a pilot's helmet relatively to an aircraft cockpit. However, mechanical arrangements of any sort are undesirable in the environment of an aircraft simulator cockpit.

It is preferred to effect helmet orientation sensing by non-contact means. Any suitable known head/helmet orientation sensor may be used in apparatus of the present invention to provide electrical signals defining instantaneous helmet orientation. One such sensor is that described by R. G. Stoutmeyer and others in U.S. Pat. No. 3,917,412, entitled "Advanced Helmet Tracker Using Lateral Photodetection and Light-Emitting Diodes". Such apparatus is further described by Edgar B. Lewis in U.S. Pat. No. 4,028,725, entitled "High-Resolution Vision System".

Throughput Delay Error Compensation Unit, Line Scan Control and Frame Scan Control As has been explained earlier in the description, the C.G.I. image generator 20 takes an appreciable time to compute a new view for display when the pilot's line of view is changed. The delay is of the order of 100 m secs. However, when any viewer changes his line of view, by extensive head movement, there is a delay before the viewer appreciates the new view before him. This delay also is of the same order of time as the image generator delay.

In a simplified form of the apparatus according to the invention means are provided merely to ensure that the old display is not projected in the new line of view of the changed head position.

In this simplified form of the apparatus, a large change of head orientation signal on line 84 or on line 85, respectively, is effective to blank out the corresponding projected view for a period of some 100 m secs. until the new view has been computed.

The apparatus of FIG. 1 provides means for the derotation of the pilot's projected image upon rotation of the pilot's head and similarly for the derotation of the co-pilot's projected image upon rotation of the co-pilot's head. Derotation is considered to be of especial importance when head movement is such that the new field of view is not separate from the old field of view but is within it or overlaps it.

The displayed view is some 100° in azimuth and some 70° in elevation, with respect to the pilot's or co-pilot's respective line of view. Although a viewer's field of view may exceed these angles, the marginal areas are low-interest and the central area of prime-interest may be a cone of perhaps only 5° about the line of vision. It is therefore readily possible for the pilot to change his line of view so as to move this area of central interest within the initial displayed view area.

In the apparatus of FIG. 1, line scan is generally across the screen 14 and frame scan is orthogonal thereto. The head orientation sensor 22 provides signals resolved into head azimuth movement and head pitch movement, for the pilot and co-pilot, on lines 84 and 85 respectively.

The synchronising pulse generator 106 provides a line synchronising and frame synchronising pulse output of equally spaced apart pulses. Upon change of head azimuth, the output signal on line 84 causes unit 100 to provide a relative change of phase of the line synchronising pulses supplied by control unit 92 to the line scanner 42, and the video synchronising pulses supplied by the throughput delay error control unit to a frame buffer provided within the image generator 20, in the sense to displace the displayed image equally and oppositely to every change of head azimuth.

Similarly, the output signal on line 84 causes unit 100 with frame scan control unit 96 to provide a relative change of phase of the frame synchronising pulses supplied by control unit 96 to the frame scanning motors 74 and 76.

Thereby, upon pilot head rotation in azimuth or pitch or both, the corresponding displayed view is displaced oppositely. The derotation is maintained for a period of some 100 m secs., unitl the new view is computed. The original relative timing of the synchronising pulses is then restored, so that the new view is displayed in the direction of the new line of view.

In similar manner, upon co-pilot's head rotation, in azimuth or pitch or both, the co-pilot's displayed view is displaced oppositely.

I claim:

1. Head-coupled, area-of-interest, visual display apparatus providing pseudo-collimated viewing for more than one viewer, comprising a part-spherical retro-reflective screen of area greater than a viewer's field of view and, for each viewer, a helmet, sensing means for sensing the orientation of the respective viewer's head and helmet, visual image generating means for generating an image representing a simulated view in the direction of the respective viewer's instantaneous line of view according to a common simulated vehicle position and heading and under control of the respective sensing means, a laser light source for producing a laser beam, a laser beam modulator for modulating said laser beam, optical means for providing identical left eye and right eye views, separate line scanners for each said view for scanning the modulated laser beam over the input ends of respective fibre optic light guides, the said fibre optic light guides having their output ends at spaced-apart positions on the respective viewer's helmet, and frame scanning means mounted on the said helmet for receiving light from the light guide outputs and projecting the light as a scanned image upon the said screen.

2. Head-coupled, area-of-interest, visual display apparatus as claimed in claim 1, in which the visual image generating means comprises a plurality of image generators of the computer-generated image type, one image generator for each said viewer, each generating an image representing the simulated view in the direction of the respective viewer's instantaneous line of view.

3. Head-coupled, area-of-interest, visual display apparatus as claimed in claim 2, in which each image generator provides indentical modulation signals for a corresponding pair of left eye and right eye laser beam modulators.

4. Head-coupled, area-of-interest, visual display apparatus as claimed in claim 3, in combination with a ground-based craft flight simulator, in which each computer-generated image generator is provided with input signals from a craft flight computer defining craft position and altitude and is also provided, by way of a summing unit, with input signals from the craft flight simulator defining craft attitude and each image generator is further provided with input signals from the said sensing means defining the respective viewer's head attitude.

5. Head-coupled, area-of-interest, visual display apparatus as claimed in claim 4, wherein said line scanners and said frame scanning means are each provided with control means and wherein each image generator is of a form subject to perceptible delay in computing its simulated image upon change of said respective viewer's instantaneous line of view from a first line of view to a new line of view, including throughput delay error compensation means corresponding to each image generator and corresponding viewer which is supplied with an input signal from the respective viewer's head and helmet orientation sensing means and is operative to compensate the line scan control means and the frame scan control means corresponding to the respective viewer's displayed image so as to project the scanned image upon the screen in said first line of view for the period of said delay.

6. Head-coupled, area-of-interest visual display apparatus as claimed in claim 1, in which the retro-reflective screen has a reflective characteristic such that it reflects a lesser proportion of light along the line of incidence from the frame scanning means to the screen and a greater proportion of light along the viewer's line of view from the screen to the viewer's eyes.

* * * * *